Figure 1:
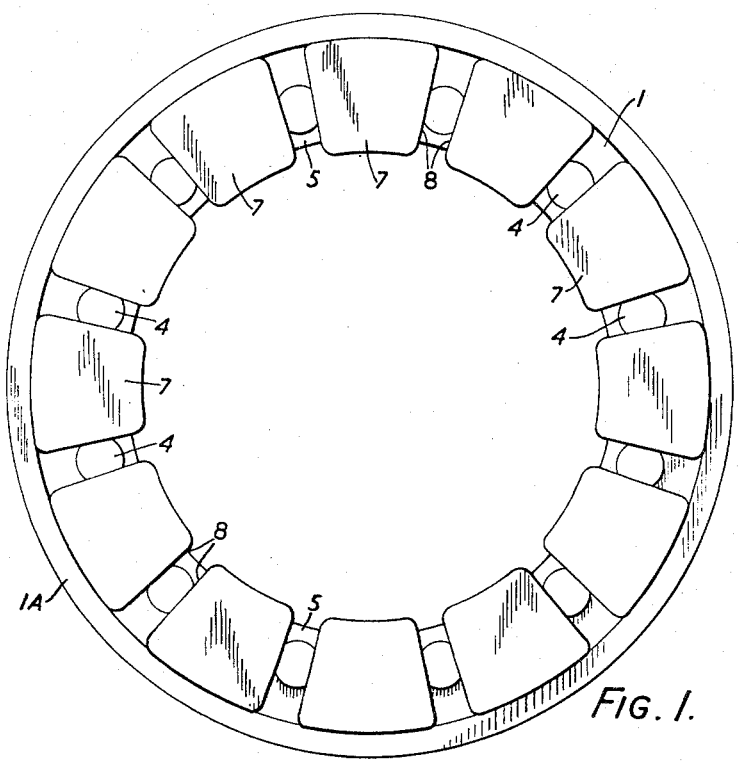

Aug. 17, 1965

A. HILL 3,201,184

THRUST BEARINGS

Filed Jan. 14, 1963

2 Sheets-Sheet 1

INVENTOR
ALFRED HILL

BY

ATTORNEY

INVENTOR
ALFRED HILL
BY

ATTORNEY

United States Patent Office 3,201,184
Patented Aug. 17, 1965

3,201,184
THRUST BEARINGS
Alfred Hill, Wembley, England, assignor to The Glacier Metal Company Limited, Wembley, England, a company of Great Britain
Filed Jan. 14, 1963, Ser. No. 251,143
Claims priority, application Great Britain, Jan. 19, 1962, 2,112/62
4 Claims. (Cl. 308—160)

This invention relates to thrust bearing assemblies of the kind comprising a support, for example a carrier ring, carrying an annular series of separate thrust pads the front faces of which (herein called working surfaces) constitute the bearing surface against which in use bears the co-operating annular bearing surface on a rotating member, and is applicable to such thrust bearing assemblies whether of the type in which during operation the thrust pads are mounted on the support in such a way that they can tilt individually relatively to the support, or of the type in which during operation the thrust pads cannot tilt relatively to the support.

In one form of such thrust bearing assemblies, as at present in use, each thrust pad has on its rear face a projection of dovetail cross-section in planes containing the axis of the bearing as a whole (that is to say the axis about which the rotating member associated with the bearing rotates when the bearing is in use), and the dovetail projections lie within an annular recess which is formed in the support, and is of corresponding dovetail cross-section in planes containing the axis of the bearing so that the thrust pads are held from becoming detached from the support by movement of the thrust pads relatively to the support in a plane normal to the plane of the working surfaces. In such known constructions the insertion of the projections on the thrust pads into the annular recess in the support and the removal of the projections from such annular recess is allowed for either by forming the support in two detachable semi-circular parts so that the projections can be fed into or removed from the exposed ends of the two halves of the recess when the two parts are separated from one another, or by providing a "gate" in the recess which allows the projections on the thrust pads to be fed into the recess one by one through the "gate" and slid around the recess into their appropriate positions. In the thrust bearing assembly so constructed the thrust pads are either free to slide around the recess or are held from such sliding movement by a stop at an appropriate point in the recess.

In the construction referred to, the thrust pads are also supported around their radially facing outer edges (for convenience herein referred to as their outer edges) by a locking or retaining ring secured to the support.

It is an object of the present invention to provide an improved form of thrust bearing assembly of the kind referred to which will be comparatively easy to manufacture and assemble, will enable individual thrust pads to be removed and replaced readily when desired and in which the individual thrust pads when assembled on the support will be held from unintentional detachment therefrom.

In a thrust bearing assembly according to the present invention comprising a supporting member (e.g. a carrier ring) carrying an annular series of separate thrust pads, there are formed in the adjacent sides of each adjacent pair of thrust pads, grooves displaced from the rear face of each thrust pad, and there is carried by the supporting member, between each adjacent pair of thrust pads, a retaining pin having a head, oppositely projecting side portions of which extend respectively into the grooves in the sides of the adjacent pair of thrust pads so as to prevent the thrust pads becoming detached from the supporting member by movement of the thrust pads relatively to the supporting member in a direction at right angles to the working surfaces of the thrust pads.

The groove in each side of each thrust pad may extend radially inwards from a point intermediate in the radial length of the associated side of the thrust pad towards or up to the radially facing inner edge (for convenience herein referred to as the inner edge) of the thrust pad, in such manner that, with the retaining pins in position in the supporting member each thrust pad can be slid radially outwards from and inwards into its normal operating position. In this case means will be provided to prevent the unintentional radial outward sliding movement of the thrust pads from their normal operating position and these means conveniently comprise a retaining ring or the equivalent detachably secured to the supporting member and having a rim part which, when the thrust pads are in their normal operating positions, lies against or adjacent to the outer edges of the thrust pads so as to prevent the thrust pads sliding radially outwards out of engagement with the heads of the retaining pins.

In an alternative arrangement, the grooves in the sides of the thrust pads may be of such segmental or other form in relation to the dimensions of the portions of the heads of the retaining pins which lie therein, that the engagement of the heads of the retaining pins with the grooves substantially prevents, or limits, radial sliding movement of the thrust pads relatively to the supporting member. In this construction also the outer edges of the thrust pads may be surrounded by a "retaining ring" secured to the supporting member.

For ease of manufacture and convenience it will generally be preferred to employ retaining pins having heads of circular cross-section but it is to be understood that constructions in which the heads of the retaining pins are of other cross-section are included within the scope of the invention.

In any case the thrust pads may be provided with substantially flat rear surfaces which during operation bear against corresponding flat surfaces on the supporting member or may be otherwise formed so that in operation the thrust pads are held from individual tilting relatively to the supporting member, or the rear surface of each thrust pad or the part of the supporting member lying behind each thrust pad may be formed to provide a radially extending or other fulcrum for the thrust pad, about which fulcrum, during operation, the thrust pad can thus tilt relatively to the supporting member. It will be understood that in the former case the heads of the retaining pins can, if desired, make such a close fit within the grooves in the sides of the thrust pads as to allow for little or substantially no tilting movement of the pads relatively to the supporting member whereas in the latter case, the heads of the retaining pins must have such dimensions relatively to the grooves as to allow for the required degree of individual tilting movement between the thrust pads and the supporting member.

Two forms of thrust bearing assembly according to the present invention, together with certain modifications, will now be described by way of example with reference to the accompanying drawings, in which—

Figure 2:
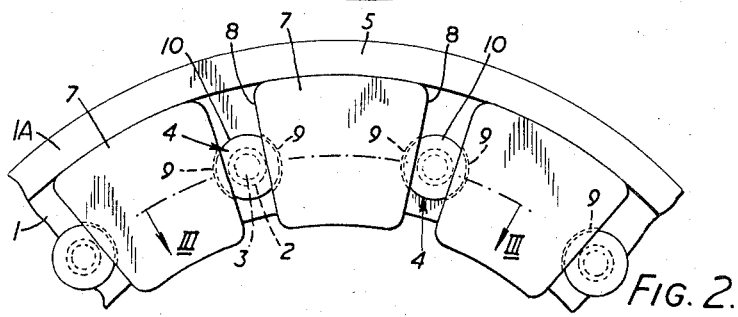
Figure 3:
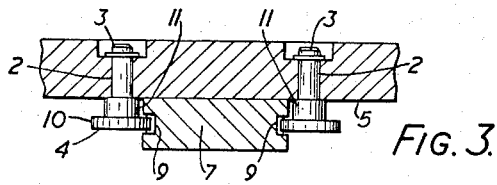
Figure 4:
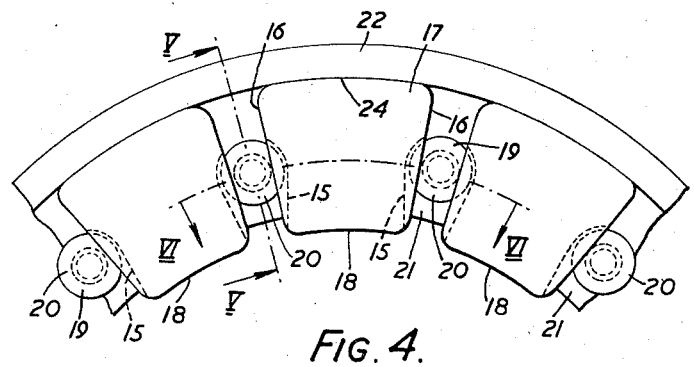
Figure 5:
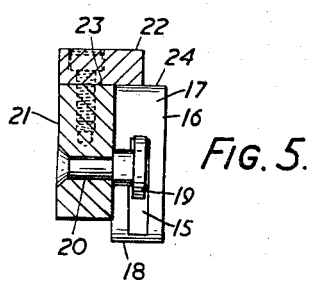
Figure 6:
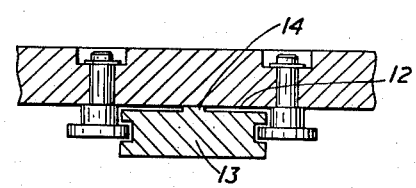

FIGURE 1 is a front view of a thrust bearing assembly according to the invention that is to say a view looking towards the working surfaces of the thrust pads, FIGURE 2 is a front view on a somewhat enlarged scale showing three adjacent thrust pads and the associated retaining pins of the bearing assembly shown in FIGURE 1, FIGURE 3 is a cross-section on the arcuate line III—III of FIGURE 2 of the thrust pad shown in full and the two associated retaining pins shown in FIGURE 2, FIGURE 4 is a similar view to FIGURE 2 of part of a modified arrangement of bearing assembly according to the invention which in front view would be similar to FIGURE 1, FIGURE 5 is a cross-section on the line V—V of FIGURE 4, and FIGURE 6 is a similar view to FIGURE 3 showing a further modified form of thrust pad which may be used in a thrust bearing assembly according to the invention otherwise similar to that described hereinafter with reference to FIGURES 1 to 3 or to FIGURES 4 and 5.

The thrust bearing assembly shown in FIGURES 1, 2 and 3 comprises an annular supporting member in the form of a carrier ring 1 through which extends a series of cylindrical bores 2 which have their axes parallel to and equally angularly spaced around the axis of the ring 1 and are formed to receive the shanks 3 of retaining pins 4. The front face 5 of the carrier ring 1 against which thrust pads are to bear, is flat and, arranged with their rear surfaces engaging the face 5, is an annular series of thrust pads 7 of conventional generally trapezoidal form, equal in number to the bores 2 and arranged so that the axis of each bore 2 lies midway between the radially extending sides 8 of an adjacent pair of the thrust pads 7. Formed in the radial sides 8 of the thrust pads are segmental grooves 9. The curved surface constituting the arcuate base of each of these segmental grooves is cut from a centre on the axis of the adjacent bore 2 in the carrier ring 1 and has a radius of curvature somewhat greater than the radius of curvature of that bore 2.

Each retaining pin 4 has a cylindrical head portion 10 which projects between the adjacent pair of thrust pads 7 and is of larger diameter than the shank 3 and of slightly less diameter than twice the radius of curvature of the arcuate base surfaces of the grooves 9 in the sides 8 of the thrust pads 7. Thus, two diametrically opposite portions of each head 10 lie respectively within the two segmental grooves 9 in the adjacent sides 8 of the adjacent pair of thrust pads 7.

Each retaining pin 4 also has a part 11 constituting a distance piece lying between the head 10 and the shank 3 and having a diameter intermediate between that of the head 10 and that of the shank 3, this distance piece 11 serving to space the head 10 from the adjacent face 5 of the carrier ring 1 by a distance such that the heads 10 of the retaining pins 4 engage the grooves 9 freely and so that, while the engagement of the heads 10 of the retaining pins 4 with the grooves 9 in the thrust pad 7 prevents the pads from becoming detached from the carrier ring 1, the retaining pins 4 do not draw the thrust pads into close and firm engagement with the adjacent face 5 of the carrier ring 1. A retaining ring 1A is provided, as shown in FIGURE 1, to prevent or limit outward radial movement of the thrust pads.

The retaining pins 4 may be detachably held in position in their bores 2 in the carrier ring 1 in various ways, for example by circlips engaging grooves in projecting end portions of the retaining pins remote from their heads 10 as shown in FIGURE 3, or by split pins or by nuts engaging screwthreads on projecting end portions.

In the modified construction according to the invention shown in FIGURES 4 and 5 which may be applied to a thrust pad assembly, otherwise similar to that described with reference to FIGURES 1 to 3, the arrangement is similar to that described with reference to FIGURES 1 to 3 except that the thrust pads have grooves 15 in their sides 16 which instead of all being of segmental form as are the grooves 9 in FIGURES 1 to 3, extend from a point intermediate in the length of each side 16 of each thrust pad at which the groove 15 is at its greatest depth inwards in a generally radial direction until the groove 15 opens through the side (and/or the inner circumferential edge 18 of the thrust pad 17), all in such manner that the bases of the grooves 15 in the two sides 16 of each thrust pad 17 when viewed in a direction parallel to the axis of the bearing, lie parallel to one another as shown in FIGURE 4. Thus the thrust pads 17 can be slid out of engagement with the heads 19 of retaining members 20 in an outward radial direction.

In this case the retaining pins 20 are permanently connected to the supporting carrier ring 21, e.g. by rivetting, since, as will be seen, the thrust pad 17 can be removed from the carrier ring 21 without necessarily first removing the appropriate retaining pins 20. A retaining ring 22 is secured to the carrier ring 21 by screws 23 and extends around the outer circumferential edges of the thrust pads 17 to prevent their unintentional outward radial movement out of engagement with the retaining pins 20.

In the modification shown in FIGURE 6, which may be applied to a bearing assembly otherwise similar to that described with reference to FIGURES 1 to 3 or with reference to FIGURES 4 and 5, instead of the flat surface 5 of the carrier ring being engaged by flat faces on the rear of the thrust pad 7, the rear surface 12 of each of a series of thrust pads 13, otherwise similar to the thrust pads 7, is provided with a radially extending ridge 14 or similar formation providing a fulcrum about which the thrust pad 13 can tilt individually during operation. Alternatively the face 5 of the carrier ring 1 may be provided with radially extending ridges engaging flat or otherwise suitably formed faces on the thrust pads to provide fulcra about which the thrust pads can tilt individually. In either case the ridges may extend other than radially, e.g. tangentially, according to the axes about which it is desired that the pads shall be capable of tilting.

What I claim as my invention and desire to secure by Letters Patent is:

1. A thrust bearing assembly comprising a supporting member, an annular series of separate thrust pads the front faces of which form a working surface extending over substantially their entire circumferential extent and wherein there are formed in the adjacent sides of each adjacent pair of thrust pads, grooves displaced from the front and rear faces of each thrust pad, and a retaining pin carried and held against relative axial movement by said supporting member between each adjacent pair of thrust pads, each retaining pin having a head the oppositely projecting side portions of which extend respectively into said grooves in the sides of the adjacent pair of thrust pads and prevent the thrust pads from becoming detached from the supporting member by movement of the thrust pads relatively to said supporting member in a direction at right angles to said working surface.

2. A thrust bearing assembly comprising a supporting member, an annular series of separate thrust pads the front faces of which form a working surface extending over substantially their entire circumferential extent and wherein there are formed in the adjacent sides of each adjacent pair of thrust pads, grooves displaced from the front and rear faces of each thrust pad, and a retaining pin carried and held against relative axial movement by said supporting member between each adjacent pair of thrust pads, each retaining pin having a head the oppositely projecting side portions of which extend respectively into said grooves in the sides of the adjacent pair of thrust pads and prevent the thrust pads from becoming detached from the supporting member by movement of the thrust pads relatively to said supporting member in a direction at right angles to said working surface, each groove in each side of each thrust pad extending radially inwardly from a point intermediate in the radial length of the associated side of the thrust pad towards the inner edge of the thrust pad to a point such that, with the retaining pins in position on said supporting member each thrust pad can be slid radially outwardly from and radially inwardly into its normal operating position.

3. A thrust bearing assembly as claimed in claim 2, including a retaining ring detachably secured to the supporting member having a rim part which, when the thrust pads are in their normal operating positions, lies adjacent to the outer edges of the thrust pads and prevents the thrust pads sliding radially outwardly out of engagement with the heads of the retaining pins.

4. A thrust bearing assembly as claimed in claim 1, in which the grooves in the sides of the thrust pads are of such form in relation to the dimensions of the portions of the heads of the retaining pins which lie therein, that the engagement of the heads of the retaining pins with the grooves limits radial sliding movement of the thrust pads relatively to the supporting member and in which the retaining pins are detachable from the supporting member.

References Cited by the Examiner

UNITED STATES PATENTS

| | | | |
|---|---|---|---|
| 1,670,636 | 5/28 | Schein | 308—160 |
| 2,363,430 | 11/44 | Meldahl | 308—160 |
| 2,744,799 | 5/56 | Howarth | 308—160 |
| 3,142,519 | 7/64 | Abramovitz | 308—160 |

FOREIGN PATENTS

| | | |
|---|---|---|
| 197,639 | 5/58 | Austria. |
| 957,368 | 2/50 | France. |
| 514,691 | 3/30 | Germany. |
| 201,459 | 8/23 | Great Britain. |

DON A. WAITE, *Primary Examiner*.

FRANK SUSKO, ROBERT C. RIORDON, *Examiners*.